(12) United States Patent
Donald et al.

(10) Patent No.: US 6,244,133 B1
(45) Date of Patent: Jun. 12, 2001

(54) CAM AND FOLLOWER SYSTEM FOR AN OPEN-END SPINNING MACHINE

(76) Inventors: Bryson W. Donald, 213 Wren Crossing La., Easley, SC (US) 29642; Timothy Henry, P.O. Box 178, Holder Cove La., Rabun Gap, GA (US) 30768

(*) Notice: Subject to any disclaimer, the term of this patent is extended or adjusted under 35 U.S.C. 154(b) by 0 days.

(21) Appl. No.: 09/400,160

(22) Filed: Sep. 21, 1999

(51) Int. Cl.⁷ ................................... F16H 53/00
(52) U.S. Cl. ............. 74/567; 74/568 R; 74/568 FS; 74/568 M; 74/568 T; 74/569; 29/402.09; 29/402.11; 29/402.12; 29/402.14
(58) Field of Search ............... 29/402.09, 402.11, 29/402.12, 402.14; 74/567, 568 R, 568 FS, 568 M, 568 T, 569

(56) References Cited

PUBLICATIONS

Schlafhorst® Spare Parts Catalog Pages.

*Primary Examiner*—John J. Calvert
*Assistant Examiner*—Shaun R. Hurley
(74) *Attorney, Agent, or Firm*—Leatherwood Walker Todd & Mann, P.C.

(57) ABSTRACT

A cam and follower system for use with an automatic doffing system of a rotor spinning machine. The system includes a cover member for covering the cam lobes of a cam gear found in the automatic doffing system of a rotor spinning machine. The system also includes a cam follower for connection to the automatic doffing system. The cover member has cam surfaces which are complimentary to and which act to renew the original cam surfaces of the cam gear's cam lobes. The cam follower is adapted to engage and ride upon the cover member's cam surfaces during operation of the automatic doffing system.

17 Claims, 5 Drawing Sheets

CAM AND FOLLOWER SYSTEM FOR AN OPEN-END SPINNING MACHINE

BACKGROUND OF THE INVENTION

This invention relates generally to a cam lobe cover and cam follower for use in the doffing mechanism of an open-end textile fiber spinning machine.

In the process of making yarn from textile fibers, raw fibers, whether synthetic or natural, are generally supplied to a carding machine, which typically forms the fibers into a thin web, which is subsequently condensed into a generally elongated cylindrical form, known as sliver. The sliver is then transferred from the carding machine, usually in barrel-type containers, known as "cans." The cans of sliver may then be transferred to a roving machine, draw frame, or the like for further processing.

Eventually, the sliver is presented to a spinning machine, such as a ring spinning or rotor spinning machine. In a ring spinning operation, the sliver is twisted through means of a traveler carrying the sliver at high speeds around a ring, which encircles a reciprocating bobbin or package, on which the ring-spun yarn is deposited. In rotor spinning the sliver is separated into individual fibers and fed into a rotor rotating at thousands of revolutions per minute. The fibers are thrown outwardly within the rotor by means of centrifugal force and are rotated in a yarn, which is pulled from the rotor and wound directly onto packages. These packages, once filled, are removed, or "doffed," from the rotor spinning machine. In certain machines, this doffing operation is performed automatically.

One particular rotor spinning machine, specifically, the Autocoro® machine, manufactured by Schlafhorst of Germany, includes an automatic doffing system for doffing your packages. The system includes linkages for physically removing the package from the machine. A housing for the linkages is provided which includes a toothed gear with a cam surface, on which a follower rides during the automatic doffing process. Over time, this gear, which is made of nylon, tends to wear and must be replaced, together with replacement of the follower. Replacement of the gear typically occurs concurrently with rebuilding of the linkage housing, or "box," and removal of the box from this rotor spinning machine requires the machine to be stopped for approximately an hour while a replacement box is installed.

Accordingly, it would be desirable to improve the longevity of the cam and follower in the box and to reduce the downtime of the rotor spinning machine while such components are being replaced.

SUMMARY OF THE INVENTION

It is, therefore, the principal object of this invention to provide a cam and follower system for a rotor spinning machine.

Another object of the present invention is to provide a cam lobe cover and follower for a rotor spinning machine.

Still another object of the present invention is to provide a method of changing cam surfaces in a rotor spinning machine.

Generally, the present invention includes a cam lobe cap, or cover, which is placed over the cam portion of the cam member, or cam gear, of an automatic doffing box for a rotor spinning machine. The cam cover, or sleeve, is preferably formed of metal, such as steel or stainless steel, and includes a generally cylindrical cap portion for covering the first cam portion of the cam gear, and a second portion standing upwardly from the cap portion for covering a second cam surface of the cam gear.

When the cam surfaces of a cam gear become worn, the cam lobe cover of the present invention is installed on the cam gear, with the cam gear remaining in place within the automatic doffing system. This reduces the downtime of the machine since the cam gear does not have to be removed from the machine. Preferably, once the cam lobe cap of the present invention is installed, a new cam follower designed in accordance with the present invention will also be installed for engaging and following the cam surfaces defined by the cam cover.

The cam follower is preferably of a ball bearing design, having a steel, or stainless steel, outer surface. The follower can be a bushing such as a bushing model number R1560ZZ, manufactured by MNB Company of Massachusetts. The follower is of smaller diameter than the follower originally provided in the automatic doffing system, since the clearance between the new cam surface provided by the cam cover and an intermediate wall of the cam gear is less than the distance between the intermediate wall and the original camming surfaces.

The present invention also includes a method of changing the cam surfaces of an automatic doffing system by first inserting a cam cover over existing cam surfaces and then by installing a cam follower of smaller diameter.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
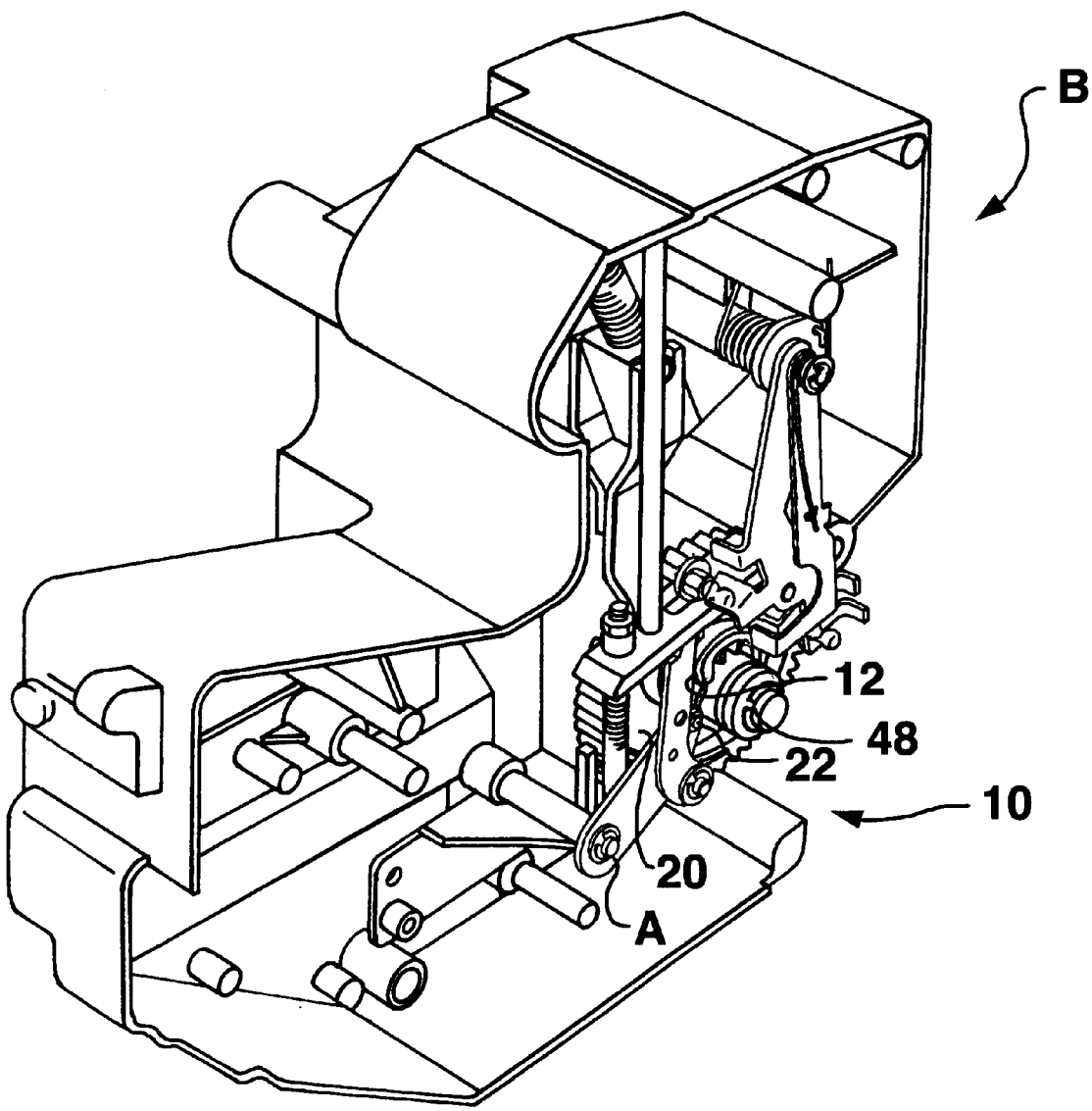
FIG. 1 is a perspective view of a portion of a doffing unit of an open-end spinning machine having a cam and follower system constructed in accordance with the present invention installed thereon.

The accompanying drawings and the description which follows set forth this invention in its preferred embodiment. However, it is contemplated that persons generally familiar with textile machinery will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the cam and follower system of the present invention is indicated generally in the figures by reference character 10.

Turning to FIG. 1, the cam and follower system 10 is shown installed in a cam and linkage box, generally B, of an automatic doffing system for a Schlafhorst Autocoro® machine (not shown). Cam cover 12 is shown installed on the camming surfaces 14, 16 (FIG. 6) of cam gear, generally C. Cam sleeve 12 is preferably formed of a hard, durable, abrasion resistant material, such as thermoplastic or steel, and in a preferred embodiment, is constructed of mild steel. Follower 20 is carried for rotation on a shaft 22, which is fixedly carried by a linkage arm A of a doffing system. Cam follower 20 is preferably of ball bearing design, having an inner race 24 and an outer race 26 (FIG. 5), and ball bearings (not shown) being disposed in between. Cam follower 20 can be of conventional design and can be a stainless steel bushing such as model number R1560ZZ, manufactured by MNB Company of Massachusetts.

Figure 2:
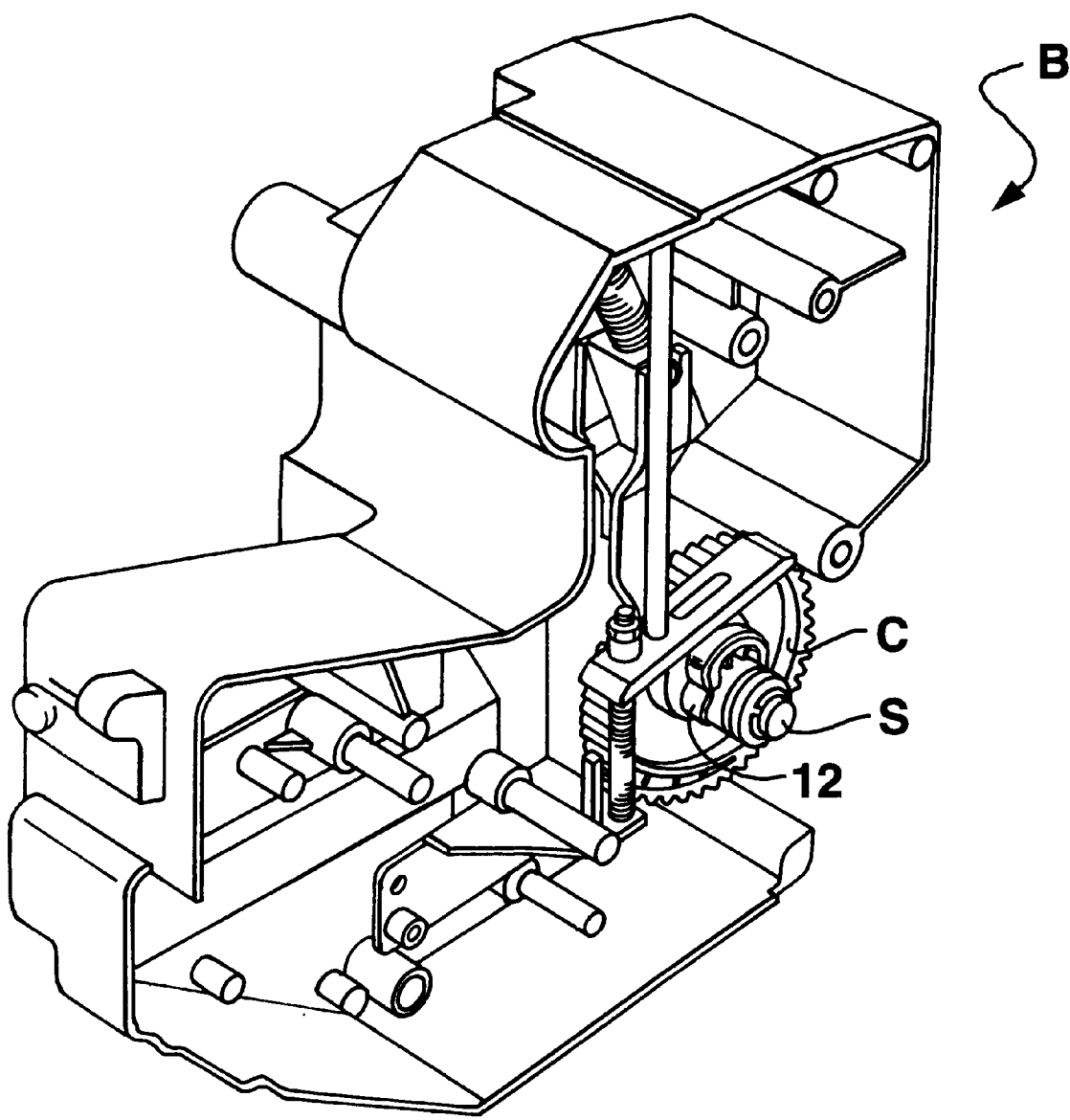
FIG. 2 is a partial perspective view of a cam and follower system constructed in accordance with the present invention.
Figure 3:
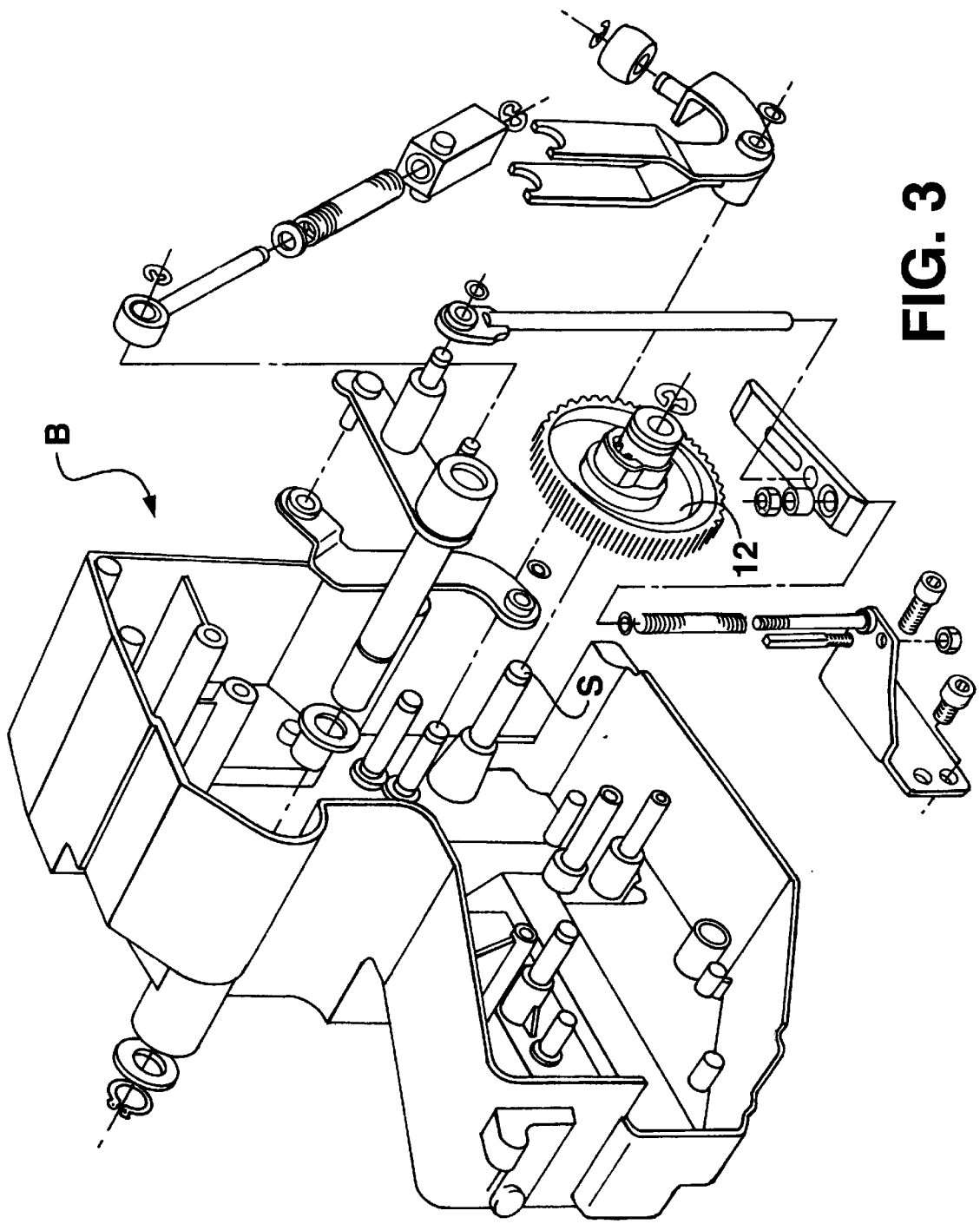
FIGS. 3 and 4 are exploded views of portions of the doffing system illustrated in FIG. 1 having a cam and follower system constructed in accordance with the present invention.

FIG. 2 illustrates a simplified version of box B with cam sprocket C having cam cover 12 installed thereon. Note that cam sprocket C is carried for rotation on shaft S of the automatic doffing system. FIG. 3 is an exploded view illustrating the configuration shown in FIG. 2.

Figure 4:
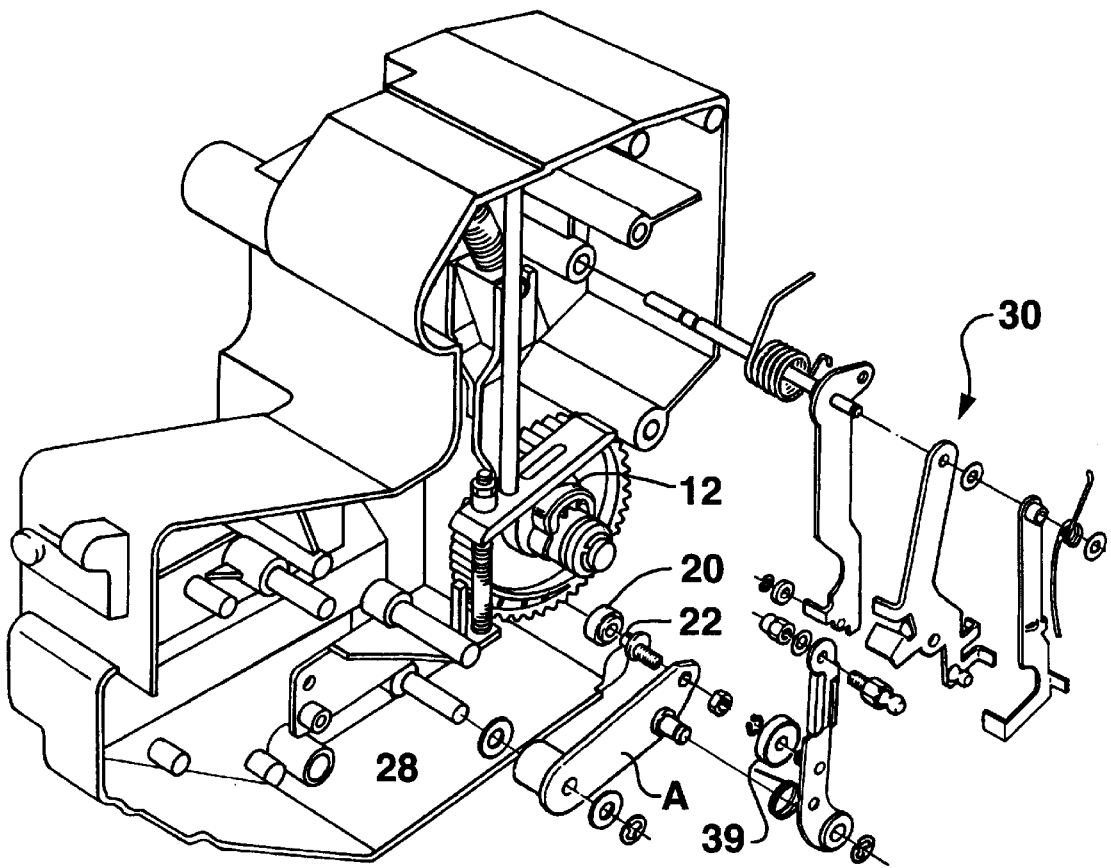

FIG. 4 is also an exploded view, this view illustrating cam follower 20 and its attachment to shaft 22 of arm A. Arm A is connected for pivoting with respect to box B on a pin 28. Further, additional linkage components, generally 30, are also provided within box B for interaction with arm A as arm A pivots.

It is to be understood that the inner workings of box B are not explained herein in detail, apart from cam cover 10 and follower 20, since such other inner workings and their operation are known components of the Schlafhorst Autocoro® machine, the structure of which is incorporated by reference.

Figure 5:
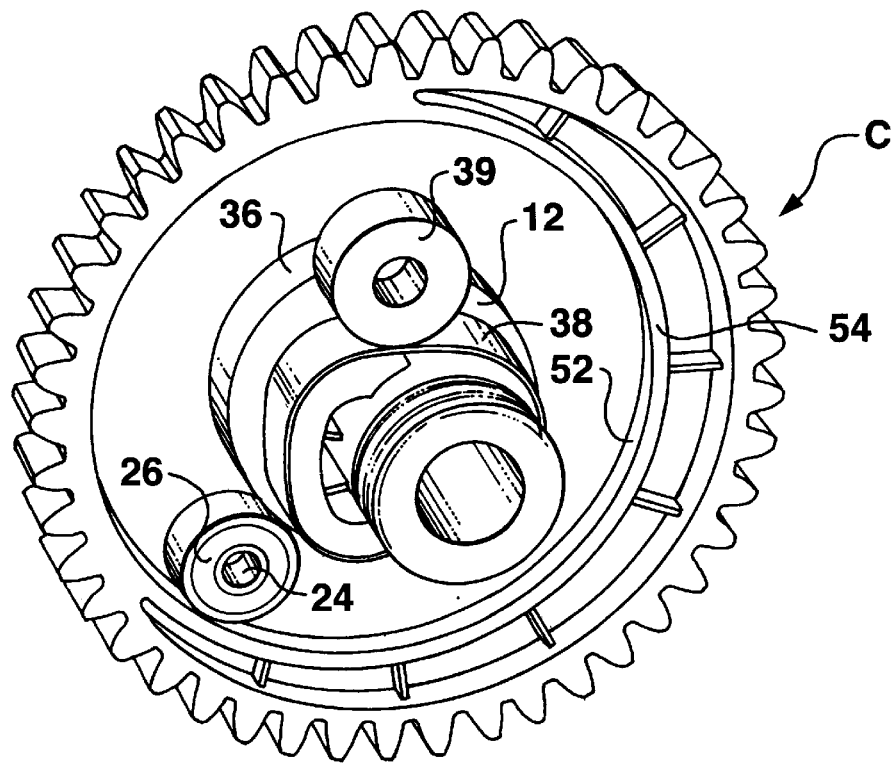
FIG. 5 is perspective view of a cam member assembly constructed in accordance with the present invention.
Figure 6:
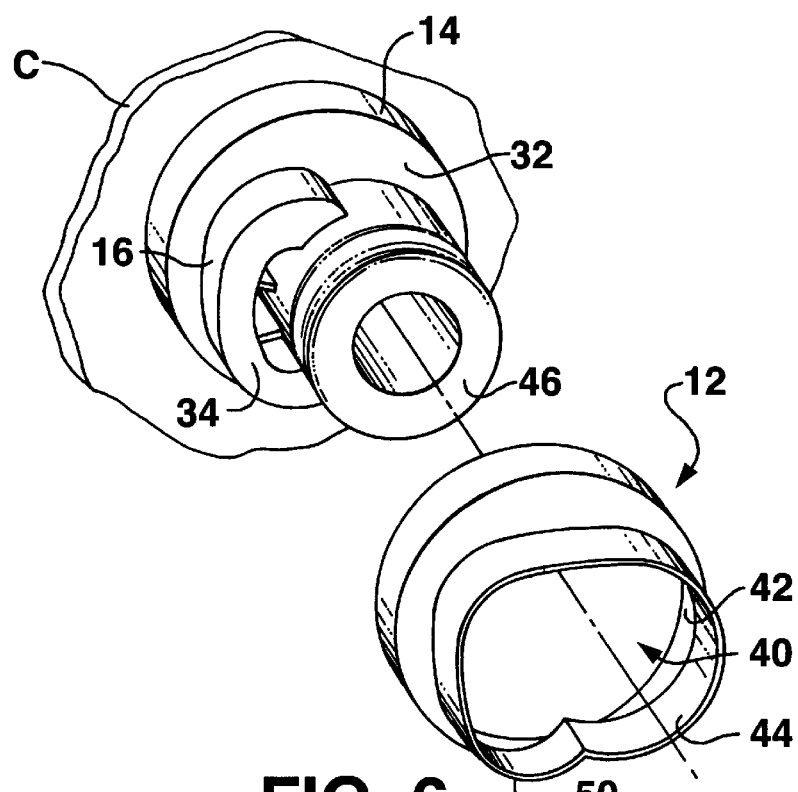
FIG. 6 is a partial exploded view of a cam member assembly constructed in accordance with the present invention.

FIG. 5 illustrates cam gear C having cam cover 12 installed on cam portions 32, 34 which have cam surfaces 14, 16, respectively. Cam cover 12, once installed over cam portions 32 and 34, as illustrated in FIG. 6, present new cam surfaces 36, 38. As best shown in FIG. 6, cam sleeve 12 includes an opening 40 for receiving and covering cam portion 32 of cam gear C. Inner surfaces 42 of cam cover 12 engage and cover cam surfaces 14 of cam portion 32. Similarly, inner surfaces 44 of cam cover 12 encircle and engage with cam surfaces 16 of cam portion 34. The fit between cam cover 12 and cam portions 32, 34 is a tight, interference fit, such that once cam cover 12 is installed, it will not move relative to cam portions 32 and 34.

The cam profiles of cam surfaces 36, 38 of cam cover 12 correspond generally to the cam profiles 32, 34 and cam surfaces 14, 16 of cam gear C, such that the cam timing of movement of the automatic doffing linkages, which is dependent on rotation of cam gear C and engagement and movement of follower 20 about cam surface 36, and cam follower 39 about cam surface 38, are not appreciably different than the cam timing of the original cam surfaces 14, 16 of cam gear 12. It is to be noted that opening 40 of cam cover 12 passes all the way through cam cover 12 to allow cam cover 12 to pass over the hub portion 46 of cam gear C and to allow shaft S to pass there through, while cam gear C retains attached to shaft S through use of a spring clip 48 (FIG. 1). This allows cam sleeve 12 to be installed without requiring cam gear C to be removed from box B.

Cam follower 20 is installed by simply removing the original equipment, or other follower, from arm A and by installing cam follower 20 in place thereof.

It is noted that cam follower 20 is of smaller diameter than the original equipment follower. This is because by adding the thickness of the walls 50 of cam sleeve 12 onto the cam surfaces 14, 16 of cam portions 32, 34, respectively, the distance between the new cam surfaces 36, 38 and the interior surfaces 52 of an intermediate wall 54 of cam gear C are less than was the case prior to installation of cam cover 12. Providing cam follower 20 of a smaller diameter thus allows for the necessary clearance between the cam follower 20 and the camming surfaces to be maintained during operation.

The method of installing the cam and follower system 10 of the present invention includes inserting cam cover 12 over cam portions 32, 34 and removing the existing cam follower and reinstalling cam follower 20 therefor.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A device for use with an automatic doffing system of a rotor spinning machine, the automatic doffing system having a cam member, the device including a cover member for covering a portion of the cam member, said cover member defining at least one cam profile, and said cam profile defining at least one cam surface.

2. The device as defined in claim 1, further comprising a cam follower for engaging and riding upon said cam surface.

3. The device as defined in claim 1, wherein said cover member includes two cam profiles.

4. The device as defined in claim 1, wherein said cover member defines an opening therethrough.

5. The device as defined in claim 1, wherein said cam surface is continuous about the periphery of said cover member.

6. The device as defined in claim 1, further comprising a cam follower for engaging and riding upon said cam surface, wherein said cam follower is of ball bearing construction.

7. The device as defined in claim 1, wherein said cover member is configured to cover and engage the cam member with an interference fit.

8. The device as defined in claim 1, wherein said cam profile of said cam cover has generally the same cam timing of the cam member.

9. The device as defined in claim 1, wherein said cover member includes two cam profiles of different cam timing with respect to one another.

10. A combination for use with an automatic doffing system of a rotor spinning machine, the automatic doffing system having a cam member defining cam surfaces, the combination including:

a cover member for covering the cam surfaces of the cam member, said cover member defining cover member cam surfaces; and a cam follower for connection to the automatic doffing system, said cam follower being adapted to engage and ride upon said cover member surfaces during operation of the automatic doffing system.

11. The device as defined in claim 10, wherein said cover member includes two cam profiles.

12. The device as defined in claim 10, wherein said cam surface is continuous about the periphery of said cover member.

13. The device as defined in claim 10, wherein said cover member is configured to cover and engage the cam member with an interference fit.

14. The device as defined in claim 10, wherein said cam profile of said cam cover has generally the same cam timing of the cam member.

15. The device as defined in claim 10, wherein said cover member includes two cam profiles of different cam timing with respect to one another.

16. A method for providing an automatic doffing system of a rotor spinning machine with cam surfaces, the automatic doffing system having a cam member and a follower, the method comprising:

providing a cover member adapted for covering the cam member, said cover member defining cam surfaces thereon; and placing said cover member on the cam member such that said cam surfaces are exposed for contact by the follower.

17. The method as defined in claim 16, further comprising:

providing a cam follower; and connecting said cam follower to the automatic doffing system; and positioning said cam follower for engagement with said cam surfaces of said cover member.

\* \* \* \* \*